United States Patent Office 3,631,092
Patented Dec. 28, 1971

3,631,092
PROCESS FOR THE PRODUCTION OF
1,3-CYCLOHEXYLENE DIISOCYANATES
Peter T. Kan, Livonia, and Moses Cenker, Trenton, Mich.,
assignors to BASF Wyandotte Corporation, Wyandotte,
Mich.
No Drawing. Filed Feb. 5, 1969, Ser. No. 796,933
Int. Cl. C07c *119/04*
U.S. Cl. 260—453 PH                12 Claims

ABSTRACT OF THE DISCLOSURE

High yields of 1,3-cyclohexylene diisocyanates are prepared by contacting 1,3-cyclohexanediamines with phosgene in the presence of hydrogen chloride. The diisocyanates when reacted with polyester or polyether polyols provide urethane compositions that are especially suitable for use as coatings, sealants, and elastomers.

---

This invention relates to a process for conversion of 1,3-cyclohexanediamines to their corresponding diisocyanates. More particularly, the invention relates to contacting 1,3-cyclohexanediamines with phosgene in the presence of hydrogen chloride to convert said diamines to their corresponding diisocyanates.

Processes for the phosgenation of aliphatic diamines are known in the prior art. One such process comprises the direct phosgenation of cyclohexanediamines in an inert solvent at an initial temperature in the range of from about 0° C. to about 5° C. followed by further phosgenation at a temperature in the range of from about 75° C. to about 140° C. The low yield of about 20% of the corresponding diisocyanate obtained by this process is unsatisfactory for commercial processing applications.

In another prior art process, cyclohexanediamines are reacted with carbon dioxide and the reaction product subsequently contacted with phosgene, first at a low temperature in the range of about 0° C. to about 5° C. and, subsequently, at a higher temperature range of about 75° C. to about 177° C. to obtain cyclohexylene diisocyanates. The yields of diisocyanates obtained in this process range from about 16.5% to about 36.0%.

An object of the invention is to provide an economical and practical process for the preparation of high yields of 1,3-cyclohexylene diisocyanates. Another object of the invention is to provide a process for the preparation of high yields of 1,3-cyclohexylene diisocyanates which process is operable for either batch or continuous operation. A further object of the invention is to provide a process for the preparation of 1,3-cyclohexylene diisocyanates in which the initial reaction product by virtue of high fluidity is capable of being processed to the desired final product with ease. A still further object of the invention is to provide a process for the preparation of commercially practical concentrations of 1,3-cyclohexylene diisocyanates in high yields. Still another object of this invention is to provide a process capable of producing high yields of 1,3-cyclohexylene diisocyanates when the process is operated at super atmospheric pressures.

The foregoing and additional objects will become apparent from the following description.

Generally speaking, the process of this invention comprises the following steps:

(a) contacting a solution of at least one 1,3-cyclohexanediamine in an inert solvent with a blend of phosgene and hydrogen chloride, each being provided in excess of one mole per equivalent of amine;

(b) continuing to contact the reaction product of (a) with phosgene in a temperature range wherein a 1,3-cyclohexylene diisocyanate corresponding to the diamine of (a) is formed;

(c) recovering the 1,3-cyclohexylene diisocyanate product from the reaction mixture.

The 1,3-cyclohexanediamine starting material may be prepared from the corresponding aromatic diamine by any suitable hydrogenation reaction, including those disclosed in U.S. Pat. No. 2,817,444.

The 1,3-cyclohexanediamine compounds or mixtures of said compounds prepared by the above-described hydrogenation process are represented by the following structural formula:

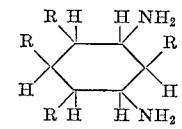

wherein each R individually is hydrogen or lower alkyl.

Representative 1,3-cyclohexanediamines which may be utilized in the practice of the invention include 1,3-cyclohexanediamine, 2-methyl - 1,3 - cyclohexanediamine, 4-methyl-1,3-cyclohexanediamine, 4,5 - dimethyl - 1,3-cyclohexanediamine and mixtures containing about 80% of 4-methyl-1,3-cyclohexanediamine and about 20% of 2-methyl-1,3-cyclohexanediamine.

The 1,3-cyclohexanediamines as prepared above are then dissolved in an inert solvent and contacted with a blend of phosgene and hydrogen chloride, each of which must be provided in excess of one mole per equivalent of amine. It is generally preferred to use about 1.1 mole of each per equivalent of amine although greater amounts can be used, e.g., 3 moles or more of each per equivalent of amine. Actually, there is nothing critical about the upper limit, the maximum amount used being usually dependent upon the economies of the process. The mole ratio of the hydrogen chloride to phosgene in the blend utilized to contact the diamine may be from about 3.0:1.0 to about 1.0:3.0 but preferably is from about 2.0:1.0 to about 1.0:1.0. Although the temperature utilized may vary considerably, it is generally employed in the range of from about 0° C. to about 85° C. and preferably, in the range of about 25° C. to about 35° C. The concentration of the diamine in the solution usually is from about 10% to about 45% by weight and preferably from about 20% to about 35% by weight.

In carrying out the prior art processes in which an amine and phosgene are the sole reactants, the phosgene is usually present in the reaction mixture in excess of one mole per equivalent of amine. The present process differs from the prior processes in that hydrogen chloride must also be present in the reaction mixture. Furthermore, it is critical that the hydrogen chloride be present in an amount in excess of one mole per amine equivalent. It has been found that the advantages of the present process as discussed hereinafter are not obtained if both the phosgene and hydrogen chloride are not employed in excess amounts as specified.

In carrying out the process batch-wise, it is usually preferred to add a phosgene-hydrogen chloride blend initially to solvent in the reaction vessel, and then charge additional amounts of a blend of the same constituents and a diamine solution as separate streams to the vessel. The initial charge of the blend insures the presence of an excess of the phosgene and hydrogen chloride, and the separate streams of the blend and diamine solution are thereafter charged at an appropriate rate to maintain the excess.

The addition of the hydrogen chloride is discontinued after all of the diamine solution has been added. The reaction mixture in this first stage of the process is a fluid mobile mixture, exhibits no significant increase in viscosity, and may be readily stirred or mixed during subsequent process operations. In the second stage of the process, the fluid reaction mixture obtained in the first stage is contacted with phosgene at a temperature at which the 1,3-cyclohexylene diisocyanate corresponding to the starting diamine is readily formed. The temperature during the contacting with phosgene may vary within a broad range of from about 50° C. to about 250° C. but generally is within a temperature range of from about 125° C. to about 175° C. The phosgene should be supplied at a rate sufficient to maintain an excess of unreacted or free phosgene in the reaction mixture in order to obtain a high diisocyanate yield. The total reaction time required for carrying out the process can vary within rather wide limits, e.g., from 1 to 50 hours or more. In general, the reaction time used is that which is of sufficient duration to complete the reaction to form the desired isocyantes. Upon completion of the reaction, the diisocyanate product may be recovered from the reaction mixture in any convenient known manner. Generally, filtration of the reaction mixture, stripping of the resulting filtrate and distillation of the stripped products are the steps employed.

In continuous operation of this process, the initial contacting of the blend of phosgene and hydrogen chloride and amine solution is carried out in the same manner as that described for the batch operation. However, since addition of the amine solution and the phosgene-hydrogen chloride blend is continued without interruption, at least one additional vessel is provided for processing of the reaction product which overflows from the first stage. The reaction product is subsequently contacted with only phosgene in the additional vessel in a manner which generally corresponds to the second stage of the batch process. The off-gases produced during processing operations subsequent to the first stage are recovered, adjusted to the desired phosgene-hydrogen chloride ratio and recycled to the first stage. The temperature and pressure conditions in the first vessel and second or subsequent vessel generally correspond to those employed in the first and subsequent stages of the batch process. The reaction mixture recovered from the terminal vessel utilized is filtered, stripped of solvent and distilled to isolate the isocyanate.

Suitable inert solvents which may be used in the practice of this invention include aromatic hydrocarbons such as benzene, toluene, xylene, cumene, cymene and the like; chlorinated aromatic hydrocarbons such as monochlorobenzene, dichlorobenzene, and trichlorobenzene and the like; saturated lower alkyl esters such as amyl acetate, ethyl caproate, methyl hexanoate, ethyl butyrate and the like. By an inert solvent is meant a solvent which is unreactive with any of the reactant materials, the dihydrochloride salt by the diamine or the final substituted 1,3-cyclohexylene diisocyanate product.

The reaction may be carried out at either atmospheric or superatmospheric pressures compatible with the particular reactants, operating conditions utilized and available processing equipment. Superatmospheric pressures of about 35 p.s.i.g. to about 250 p.s.i.g. are generally utilized for rapid operating rates and reduced apparatus size.

Representative examples of the 1,3-cyclohexylene diisocyanate final products of the invention include 1,3-cyclohexylene diisocyanate, 2 - methyl-1,3-cyclohexylene diisocyanate, 4-methyl-1,3-cyclohexylene diisocyanate, 4, 5 - dimethyl-1,3-cyclohexylene diisocyanate and mixtures containing about 80% of 4-methyl-1,3-cyclohexylene diisocyanate and about 20% of 2-methyl-1,3-cyclohexylene diisocyanate.

The above-described process of the invention provides yields of the corresponding diisocyanates of about 90%, much greater than those obtained in either the direct or carbamic acid phosgenation of the prior art. Also, no processing difficulties are experienced in the diamine conversion to the diisocyanate.

During the investigation leading to the development of the process of the invention, both the direct and the carbamic acid phosgenation of 1,3-cyclohexanediamines were utilized. The resultant yields of 1,3-cyclohexylene diisocyanates obtained from each process were found to be about 50% and 75%, respectively.

Thus, the process of this invention has the advantages as compared to the above prior art processes of providing substantially complete conversion of 1,3-cyclohexanediamines to their corresponding diisocyanates without formation of undesirable by-products and with a minimum of process complications.

A distinctive advantage of this invention is the provision of reaction products which, by virtue of their fluidity, are capable of being processed to the desired diisocyanate product with ease.

Another of the outstanding, practical advantages of the process of the invention is the utilization of diamine concentrations which when reacted wtih a predetermined quantity of a blend of hydrogen chloride and phosgene provide commercially practical concentrations of 1,3-cyclohexylene diisocyanates in high yields.

The diisocyanates provided by the invention are useful in a variety of applications, particularly in the preparation of polyurethanes, polyureas, polyurethane-polyureas, and polyamides. The diisocyanates when reacted with polyhydroxy compounds, such as polyester or polyether polyols, provide polyurethane compositions that are especially suitable for use as coatings, sealants, and elastomers.

A better understanding of the invention can be obtained by referring to the following illustrative examples which are not intended, however, to be unduly limitative of the invention.

EXAMPLE I

Xylene in the amount of 556 g. was charged to a three-liter flask fitted with a stirrer, addition funnel, thermometer, gas dispersion tube, and reflux condenser. The outlet end of the reflux condenser was connected to an absorber trap for the destruction of acidic off-gases. A 27.2 wt. percent solution of 186.4 g. (1.46 moles) of a mixture of 80% 4 - methyl-1,3-cyclohexanediamine and 20% 2-methyl-1,3-cyclohexanediamine in 500 g. of xylene was charged to the addition funnel. A blend of 40 g. of anhydrous hydrogen chloride and 30 g. of phosgene was bubbled into the xylene in the flask and simultaneous addition of the amine solution was started. The amine addition was completed in two hours, the mixture remained of about the same fluidity as prior to the amine addition, and was readily stirrable. The amount of diamine utilized in the total quantity of solvent was equivalent to a 15 percent overall amine concentration in xylene. The hydrogen chloride and phosgene blend was fed to the flask at a feed ratio in excess of one mole of each gas per equivalent of amine. A total of 360 g. of hydrogen chloride and 870 g. of phosgene was added and the temperature of the flask rose from about 28° C. to about 64° C. during the combined addition of the reactants. The hydrogen chloride feed was then terminated, i.e., after all of the amine solution had been added. The phosgene addition was continued at a rate of about 160 g. (1.6 moles) per hour and heat applied until the contents of the flask rose to a reflux temperature of about 131° C. in about 20 minutes. A reflux temperature of about 131° C. to about 139° C. was maintained for about twelve and one-half hours while the addition of phosgene was continued at the above rate. At the end of this period, the cloudy yellow solution present in the flask was cooled and any phosgene remaining in the flask removed by sweeping with nitrogen gas. The solution was then filtered and a 10" Vigreaux column utilized to strip the clear filtrate. The stripped filtrate was then distilled and an 89% yield of about 80% 4-methyl-1,3-cyclohexylene diisocyanate and about 20% of 2-methyl-1,3-cyclohexylene diisocyanate obtained.

EXAMPLE II

The procedure of Example I was followed except that 232.0 g. (1.81 moles) of the 1,3-cyclohexanediamine solution in 500 g. of xylene, constituting a 31.7% amine concentration, was slowly added to the flask containing 560 g. of xylene during a two-hour period and a ratio of 4.0 moles each of phosgene and hydrogen chloride per each mole of the diamine was fed into the flask. This concentration was equivalent to 18% amine in total solvent yet no difficulties in mixing were encountered at this concentration. The reaction was completed in 15.5 hours and an 86% yield of 80% 4-methyl-1,3-cyclohexylene diisocyanate and 20% 2-methyl-1,3-cyclohexylene diisocyanate obtained.

EXAMPLE III

Xylene in the amount of 556 g. was charged to a three-liter flask fitted with a stirrer, addition funnel, thermometer, gas dispersion tube, and reflux condenser. The outlet end of the reflux condenser was connected to an absorber trap for the destruction of acidic off-gases. A 22.4 wt. percent solution of 144 g. of a mixture of an 80% 4-methyl-1,3-cyclohexanediamine and a 20% 2-methyl-1,3-cyclohexanediamine in 500 g. of xylene was charged to the addition funnel. A blend of HCl and phosgene was bubbled into the xylene in the flask for ten minutes and the simultaneous addition of the amine solution started. The HCl-phosgene feed was maintained at a rate equivalent to 1.1 moles of each gas per equivalent of amine. The amount of the amine utilized in the total solvent was equivalent to the use of 12% by weight in total solvent charged and although some solid separation occurred, the mixture remained of about the same fluidity as prior to the amine addition. The amine addition was completed in one hour at a temperature ranging from 32° C. initially to 76° C. at the end of the addition. The HCl feed was halted and the phosgene feed continued at the rate of 150 g./hr. while the reaction mixture was heated to and maintained at 131–139° C. for 9.5 hours. After filtration, stripping and distillation of the reaction mixture, 175.1 g., an 86% yield, of a mixture containing 80% 4-methyl-1,3-cyclohexylene diisocyanate and 20% 2-methyl-1,3-cyclohexylene disocyanate was obtained.

EXAMPLE IV

The procedure and conditions of Example I were followed except that a 36.0 wt. percent solution of 180 g. of 2,4-dimethyl-1,3-cyclohexanediamine in 320 g. of xylene was added to 500 g. of xylene. The amount of diamine utilized in the total quantity of solvent was equivalent to an 18% overall amine concentration in xylene. Phosgene and hydrogen chloride were added concurrently with the amine addition for about a two-hour period until the diamine was completely added. The hydrogen chloride feed was then terminated and the addition of phosgene continued for about 15 hours at a temperature of about 132° C. to 136° C. An 85% yield of 209 g. of 2,4-dimethyl-1,3-cyclohexylene diisocyanate was obtained by filtration, stripping and distillation of the reaction mixture.

EXAMPLE V

The procedure and conditions of Example I were followed except that a 27.5 wt. percent solution of 190 g. of 1,3-cyclohexanediamine in 500 g. of xylene was added to 500 g. of xylene. The amount of diamine utilized in the total quantity of solvent was equivalent to a 16% overall amine concentration in xylene. Phosgene and hydrogen chloride were added concurrently with the amine addition for about a two-hour period until the diamine was completely added. The hydrogen chloride feed was then terminated and the addition of phosgene continued for about 13 hours at a temperature of about 132° C. to about 138° C. An 88% yield of 243 g. of 1,3-cyclohexylene diisocyanate was obtained by filtration, stripping and distillation of the reaction mixture.

EXAMPLE VI

The equipment used in this example was a 7.5-gallon stainless steel, agitated, baffle, jacketed pressure vessel fitted with a reflux condenser and two dip tubes for introducing reactants near the tips of the agitator blade. To one of the dip tubes was attached a reservoir for liquid feed with an intermediate pump for introducing the liquid feed into the reactor. To the second dip tube was attached a T-tube in which HCl and phosgene could be mixed and introduced into the pressure vessel from cylinders. The vapor outlet of the reflux condenser was attached through a variable pressure reducing valve to a scrubbing system for the destruction of acidic off-gases. A solution of 3.35 lbs. of a mixture of 80% 4-methyl-1,3-cyclohexanediamine and 20% 2-methyl-1,3-cyclohexanediamine in 11.5 lbs. of xylene (22.6% solution) was prepared and charged to the liquid feed reservoir. An additional 13 lbs. of xylene was charged to the pressure vessel and saturated at 25° C. and 50 p.s.i.g. pressure with a 2:1 mole ratio of a mixture of HCl and phosgene. With the reactor contents initially at 24° C., the amine solution was pumped into the reactor at a constant rate over a 4.5-hour period through one dip tube while simultaneously introducing through the second tube the 2:1 mole ratio mixture of HCl and phosgene at a rate equivalent to 3 moles of phosgene per equivalent of amine. The additional xylene, when combined with the solution of amine in xylene, provided an effective overall concentration equivalent to 12 wt. percent of amine in xylene. The pressure was maintained at 50 p.s.i.g. by proper adjustment of the valve at the end of the reflux condenser. At the end of the amine addition the temperature in the reactor had reached 52° C. The feed of HCl was halted and the flow of phosgene reduced to the rate of 2–3 lbs. per hour and the reaction mixture heated to 140° C. and held at this temperature for 12 hours while adjusting the pressure valve to allow the escape of HCl and maintain a pressure of 50 p.s.i.g. At the end of the 12-hour period the phosgene feed was halted, the pressure vessel gradually bled down to atmospheric pressure and the mixture refluxed for two hours. Recovery of the product as in previous examples gave an 87% yield of a mixture of 80% 4-1,3-cyclohexylene diisocyanate and 20% 2-1,3-cyclohexylene diisocyanate. The reaction went smoothly, showed no increase in viscosity, and required no significant power increases for agitation due to solids formation.

What is claimed is:

1. A process for the production of 1,3-cyclohexylene diisocyanates by reaction of 1,3-cyclohexanediamines with phosgene in the presence of hydrogen chloride comprising:
    (a) reacting at a temperature ranging from about 0° C. to 85° C. a solution of 1,3-cyclohexanediamines in an inert solvent, the solution containing from about 10 to 45% by weight of the diamine, with a blend of phosgene and hydrogen chloride, the phosgene and hydrogen chloride being present in a mole ratio of from about 3.0:1.0 to 1.0:3.0, and each being provided in excess of one mole per equivalent of amine;
    (b) contacting at a temperature ranging from about 50° C. to 250° C. the reaction product of (a) with phosgene; and
    (c) recovering a reaction mixture containing the 1,3-cyclohexylene diisocyanate product.

2. A process according to claim 1 wherein the 1,3-cyclohexanediamine is a compound or mixture of compounds represented by the following structural formula:

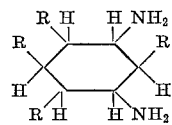

wherein each R is hydrogen or methyl.

3. A process according to claim 1 wherein the temperature of (b) ranges from about 125° C. to about 175° C.

4. A process according to claim 1 wherein the inert solvent is selected from the group consisting of aromatic hydrocarbons, chlorinated aromatic hydrocarbons and saturated lower alkyl esters.

5. A process according to claim 1 wherein the inert solvent is xylene.

6. A process according to claim 1 wherein the diamine of the solution of step (a) is 1,3-cyclohexanediamine or 2-methyl-1,3-cyclohexanediamine or 4-methyl-1,3-cyclohexanediamine or 4,5-dimethyl-1,3-cyclohexanediamine or a mixture containing about 80% of 4-methyl-1,3-cyclohexanediamine and 20% of 2-methyl-1,3-cyclohexanediamine.

7. A process according to claim 1 wherein the diisocyanate obtained is 1,3-cyclohexylene diisocyanate, 2-methyl-1,3-cyclohexylene diisocyanate or 4-methyl-1,3-cyclohexylene diisocyanate or 4,5-dimethyl-1,3-cyclohexylene diisocyanate or a mixture containing about 80% of 4-methyl-1,3-cyclohexylene diisocyanate and about 20% of 2-methyl-1,3-cyclohexylene diisocyanate.

8. A process according to claim 1 wherein a superatmospheric pressure is maintained.

9. A process according to claim 8 wherein the superatmospheric pressure is in the range of about 35 p.s.i.g. to about 250 p.s.i.g.

10. A process according to claim 1 wherein the rate of contact of the phosgene in step (b) is sufficient to provide an excess of unreacted or free phosgene in the reaction mixture.

11. A process for the preparation of 1,3-cyclohexylene diisocyanates by reaction of 1,3-cyclohexanediamines with phosgene in the presence of hydrogen chloride comprising:
   (a) introducing into a reaction zone an inert solvent and a blend of phosgene and hydrogen chloride, the mole ratio of phosgene to hydrogen chloride ranging from 3.0:1.0 to 1.0:3.0, the amount of phosgene and hydrogen chloride in said blend each being at least one mole per equivalent of amine;
   (b) adding to said reaction zone at a temperature ranging from about 0° C. to 85° C. a solution of 1,3-cyclohexanediamines in an inert solvent, the solution containing from about 10 to 45% by weight of the diamine, and a blend of phosgene and hydrogen chloride, the mole ratio of phosgene to hydrogen chloride ranging from 3.0:1.0 to 1.0:3.0, the amount of phosgene and hydrogen chloride in said blend each being at least one mole per equivalent of amine;
   (c) discontinuing the addition of said blend;
   (d) adding phosgene alone to said reaction zone in an amount sufficient to provide a reaction mixture containing an excess of unreacted phosgene while maintaining said reaction zone at a temperature in the range of about 50° C. to about 250° C.;
   (e) withdrawing reaction mixture from said reaction zone; and
   (f) recovering the 1,3-cyclohexylene diisocyanate product from the reaction mixture.

12. A process according to claim 11 wherein the 1,3-cyclohexanediamine is a compound or mixture of compounds represented by the following structural formula:

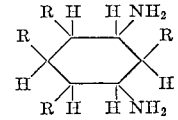

wherein each R is hydrogen or methyl.

References Cited

UNITED STATES PATENTS

| | | | |
|---|---|---|---|
| 2,374,340 | 4/1945 | Farlow | 260—453 |
| 3,119,856 | 1/1964 | Thomas et al. | 260—453 |
| 3,234,253 | 2/1966 | Cooper | 260—453 |
| 3,351,650 | 11/1967 | Cross et al. | 260—453 |
| 3,401,190 | 9/1968 | Schmitt et al. | 260—453 |
| 3,424,780 | 1/1969 | Sayigh | 260—453 |
| 3,484,472 | 12/1969 | Suzuki et al. | 260—453 |

FOREIGN PATENTS 1,038,129  8/1966  Great Britain.

CHARLES B. PARKER, Primary Examiner

D. A. TORRENCE, Assistant Examiner

U.S. Cl. X.R.

260—77.5 AT, 77.5 CH, 77.5 NC, 453 A, 563 R